United States Patent
Andoni

(10) Patent No.: US 11,870,917 B2
(45) Date of Patent: Jan. 9, 2024

(54) SYSTEMS AND METHODS FOR FACILITATING POLICY-COMPLIANT END-TO-END ENCRYPTION FOR INDIVIDUALS BETWEEN ORGANIZATIONS

(71) Applicant: Issam Andoni, Oakton, VA (US)

(72) Inventor: Issam Andoni, Oakton, VA (US)

( * ) Notice: Subject to any disclaimer, the term of this patent is extended or adjusted under 35 U.S.C. 154(b) by 885 days.

(21) Appl. No.: 16/831,494

(22) Filed: Mar. 26, 2020

(65) Prior Publication Data

US 2021/0306160 A1 Sep. 30, 2021

(51) Int. Cl.
*H04L 9/32* (2006.01)
*H04L 41/0893* (2022.01)
*H04L 9/40* (2022.01)

(52) U.S. Cl.
CPC ........ *H04L 9/3268* (2013.01); *H04L 41/0893* (2013.01); *H04L 63/0428* (2013.01); *H04L 63/20* (2013.01)

(58) Field of Classification Search
CPC ............... H04L 9/3268; H04L 41/0893; H04L 63/0428; H04L 63/20; H04L 9/0891; H04L 51/42; H04W 4/12; H04W 4/14; H04W 4/80
See application file for complete search history.

(56) References Cited

U.S. PATENT DOCUMENTS 9,992,179 B2   6/2018   Morrison et al.
2005/0010801 A1*  1/2005  Spies ............... H04L 9/3073 726/5
2005/0114652 A1*  5/2005  Swedor ............. H04L 63/0442 713/156
2006/0064581 A1   3/2006  Miller et al.
(Continued)

FOREIGN PATENT DOCUMENTS

WO    WO2014027263 A3    4/2014
WO    WO2015009508 A1    1/2015
WO    WO2018031702 A1    2/2018

OTHER PUBLICATIONS

Barath Raghavan et al., Secure and Policy-Compliant Source Routing, Jun. 2009, IEEE, pp. 764-777 (Year: 2009).*

(Continued)

*Primary Examiner* — Luu T Pham
*Assistant Examiner* — Canh Le

(57) ABSTRACT

Disclosed herein is a method of facilitating policy-compliant end-to-end encryption for individuals between organizations. Accordingly, the method may include a step of receiving, using a communication device, a first recipient indication associated with a first recipient of a first tenant from a sender device associated with a sender of a second tenant. Further, the method may include a step of retrieving, using a storage device, a predefined policy definition associated with the first tenant. Further, the method may include a step of identifying, using a processing device, a recipient certificate associated with the first recipient based on the predefined policy definition. Further, the method may include a step of retrieving, using the storage device, the recipient certificate associated with the first recipient based on the identifying. Further, the method may include a step of transmitting, using the communication device, the recipient certificate to the sender device.

14 Claims, 11 Drawing Sheets

(56) References Cited

U.S. PATENT DOCUMENTS

| | | | | |
|---|---|---|---|---|
| 2006/0174017 A1* | 8/2006 | Robertson | ............... | H04L 63/18 |
| | | | | 709/219 |
| 2008/0304669 A1* | 12/2008 | Bugbee | ................ | H04L 9/3268 |
| | | | | 380/278 |
| 2014/0095865 A1* | 4/2014 | Yerra | .................... | H04L 9/3271 |
| | | | | 713/156 |
| 2015/0039889 A1 | 2/2015 | Andoni | | |
| 2015/0280911 A1 | 10/2015 | Andoni | | |
| 2015/0326399 A1* | 11/2015 | Nigriny | ................ | H04L 9/3247 |
| | | | | 713/156 |
| 2016/0294564 A1* | 10/2016 | Mock | .................... | H04L 9/3265 |
| 2019/0364025 A1* | 11/2019 | Binsztok | ............... | H04L 9/0822 |
| 2022/0321577 A1* | 10/2022 | Greevy | ............... | H04L 63/0281 |

OTHER PUBLICATIONS

Masoud Akhoondi et al., LASTor: A Low-Latency AS-Aware Tor Client, IEEE 2012, pp. 476-490. (Year: 2012).*

* cited by examiner

SYSTEMS AND METHODS FOR FACILITATING POLICY-COMPLIANT END-TO-END ENCRYPTION FOR INDIVIDUALS BETWEEN ORGANIZATIONS

FIELD OF THE INVENTION

Generally, the present disclosure relates to the field of data processing. More specifically, the present disclosure relates to systems and methods for facilitating policy-compliant end-to-end encryption for individuals between organizations.

BACKGROUND OF THE INVENTION

Many government agencies and corporations are realizing the importance of using end-to-end encryption as a means of securing their data. However, sharing public encryption certificates between multiple organizations is not an easy task.

Existing techniques for facilitating policy-compliant end-to-end encryption are deficient with regard to several aspects. For instance, current technologies do not enable a sender of an email to easily find a public key encryption certificate for a recipient to send an encrypted email.

Therefore, there is a need for improved systems and methods for facilitating policy-compliant end-to-end encryption for individuals between organizations that may overcome one or more of the above-mentioned problems and/or limitations.

BRIEF SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating policy-compliant end-to-end encryption for individuals between organizations, in accordance with some embodiments. Accordingly, the method may include a step of receiving, using a communication device, a first recipient indication associated with a first recipient of a first tenant from a sender device associated with a sender of a second tenant. Further, the method may include a step of retrieving, using a storage device, a predefined policy definition associated with the first tenant based on the first recipient indication. Further, the method may include a step of identifying, using a processing device, at least one recipient certificate associated with the first recipient based on the predefined policy definition. Further, the method may include a step of retrieving, using the storage device, the at least one recipient certificate associated with the first recipient based on the identifying. Further, the method may include a step of transmitting, using the communication device, the at least one recipient certificate to the sender device.

Further disclosed herein is a system for facilitating policy-compliant end-to-end encryption for individuals between organizations, in accordance with some embodiments. Accordingly, the system may include a communicating device, a storage device, and a processing device. Further, the communicating device may be configured for receiving a first recipient indication associated with a first recipient of a first tenant from a sender device associated with a sender of a second tenant. Further, the communicating device may be configured for transmitting at least one recipient certificate to the sender device. Further, the sender device may be configured for encrypting a message associated with the first recipient based on the at least one recipient certificate. Further, the sender device may be configured for transmitting the message to a first recipient device associated with the first recipient. Further, the storage device may be configured for retrieving a predefined policy definition associated with the first tenant based on the first recipient indication. Further, the storage device may be configured for retrieving the at least one recipient certificate associated with the first recipient based on the identifying. Further, the processing device may be configured for identifying at least one recipient certificate associated with the first recipient based on the predefined policy definition.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
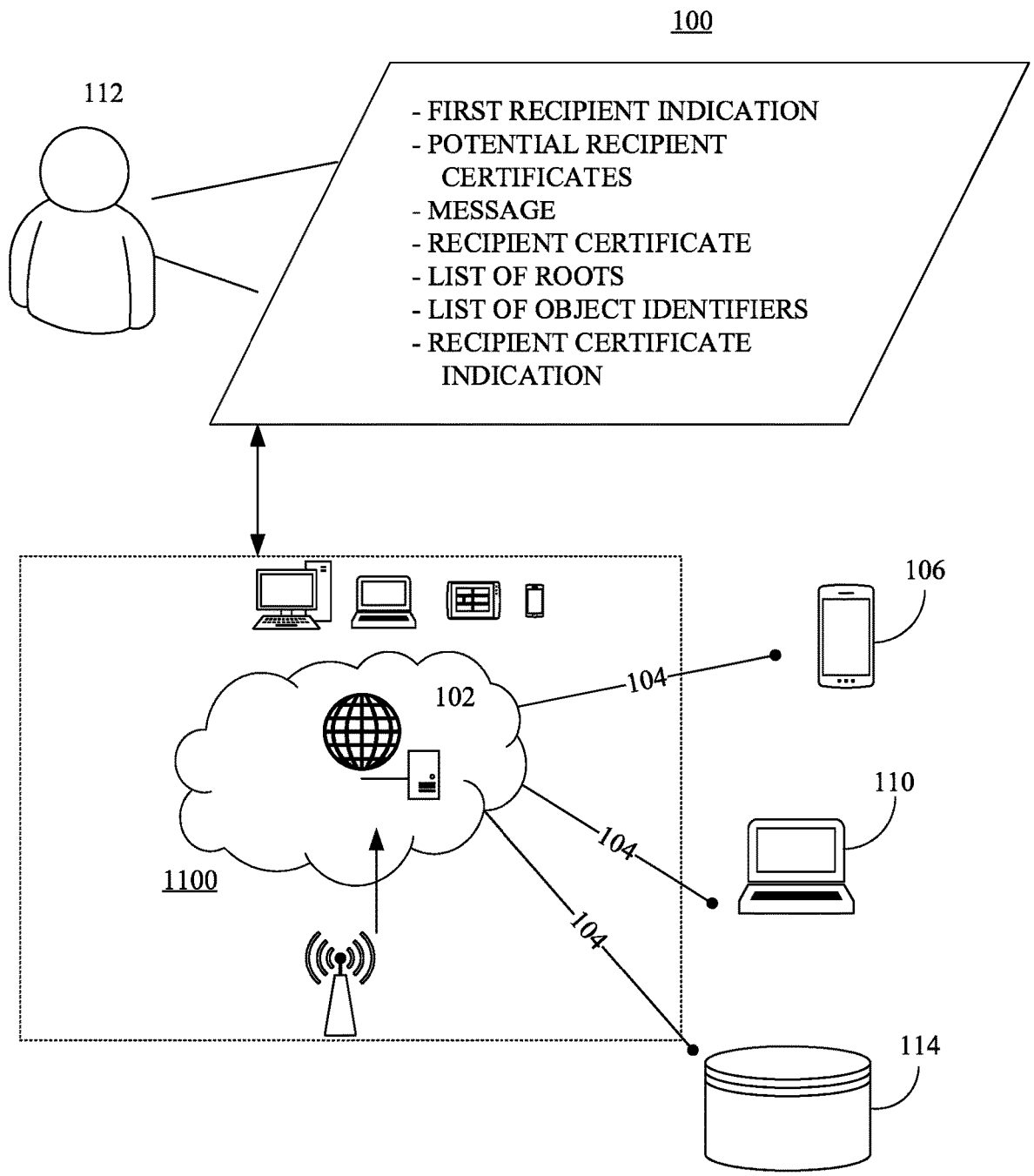
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for facilitating policy-compliant end-to-end encryption for individuals between organizations, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes systems and methods for facilitating policy-compliant end-to-end encryption for individuals between organizations. Further, the disclosed system may be called as ZeCrypt. Further, the ZeCrypt is a solution that makes policy-compliant end-to-end encryption for individuals between organizations intuitive and easy. Further, the ZeCrypt may include a VGAL (Virtual Global Address List) which may be a hosted service that enables the sender of an email to easily find a public key encryption certificate for a recipient to send an encrypted email.

Further, the disclosed system consists of multiple software components that collaborate with each other to achieve smooth end-to-end encryption that may be based on predefined policies and compliance. Further, the disclosed system may include a first component, a second component, and a third component. Further, the first component may be a Microsoft Outlook add-in that may be installed on the user's machine. Further, the add-in may add a UI button to the message compose form that when clicked may apply a custom encrypt script and then send the message. In addition, the add-in may enable the capability to do header modification to decrypt messages that are encrypted with a master certificate of the tenant. Further, the second component is the ZeCrypt online services that enable certificate retrieval and filtering based on a predefined policy definition. The online services may consist of the following components and logical services:

VGaL: A scalable encryption certificates storage and retrieval service.

Policy Enforcement Proxy Service: This service may act as the entry point to the online services. The service may validate and filter certificates based on the tenant's defined policy when getting the certificate from VGal and also when doing header modification.

Configuration and Policy Service: This component may serve requests to get policies and configurations.

Re-encryption Service: This service may re-encrypt headers that are encrypted with the tenant's master certificate using the actual user's pushed certificate. This service may use the tenant's master key, stored in a highly secure HSM, to do the decryption first. Next, it may encrypt the session key with the user's provided certificate to make decryption of the message possible at the client-side.

Further, the third component is an Administrative Web Portal that may be an authorization based portal for the management of policy definitions and tenants. Tenant' admins can use this portal to manage their organization's policy definition.

The Workflow—Sender Side:

The Microsoft Outlook add-in can be installed either by means of a setup file or by an invitation from another user who has the add-in already. The sender, who has the ZeCrypt installed already, will write a mail message. Once finished, the sender clicks the "Encrypt & Send" custom button, the add-in iterates, and processes each recipient of the message. For each recipient, the following steps apply:

If the recipient has a policy-compliant certificate, then the add-in will keep the recipient as is and move on to the next recipient.

If not, the add-in will communicate with online services trying to get a certificate for the recipient's email address.

If a certificate is found in online services, then the online service will filter the certificates returned based on policy and only give back the client the compliant certificates.

The add-in will update the recipient with that certificate and move on to the next recipient.

If no certificate back from the online services either, the add-in will use the policy master certificate for encryption.

The actual message will be sent encrypted. At the same time, an instruction message (an invitation message) will be sent to the recipient telling him how to install and be enrolled in the system.

The Workflow—Receiver Side:

The receiver will receive a message with instructions telling that the sender has sent him an encrypted message that can only be decrypted by installing the ZeCrypt add-in from the provided link.

The receiver installs the add-in.

During installation, the user will be asked to push the desired certificates to the online services to enable encryption in the future without referring to header modification.

Once the add-in finishes the installation, the encrypted message is header modified and can be decrypted.

Header Modification happens such that the add-in communicates with the ReEncrypt endpoint in the online services that decrypts the master certificate session key (ESK) using the master key (in the HSM) and encrypts back the session key using the actual certificate of the user (pushed at setup phase).

Policy Definition and Compliance

At both reading and sending of messages, the Outlook Add-in will ensure compliance with the tenant's policy definition. A Policy Definition is a set of attributes that dictates the desired certificate filtering mechanism. A policy definition may contain the following configurations:

The desired domains to match when validating against the policy.

Whether to use a global master key or a master key generated specifically for the tenant.

Policy compliance such as PIV compliance policy and SAFE compliance policy. Or a custom policy can be used by providing a list of root and OIDs.

"Only locally trusted CA" option where a list of roots will be provided.

The policy definition may specify to let any certificate pass compliance validation.

Master certificate header modification can be disabled and enabled.

The choice of an SCVP server also can be specified.

In addition, a policy specified whether the processing of a receiver opening a message must match the sender policy of not and if the receiver can read-only the message.

The certificate expiry, key encryption attributes, and email match will be check-in all cases regardless of the policy compliance specified.

Referring now to figures, FIG. 1 is an illustration of an online platform 100 consistent with various embodiments of the present disclosure. By way of non-limiting example, the online platform 100 to facilitate policy-compliant end-to-end encryption for individuals between organizations may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), and databases 114 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1100.

Figure 2:
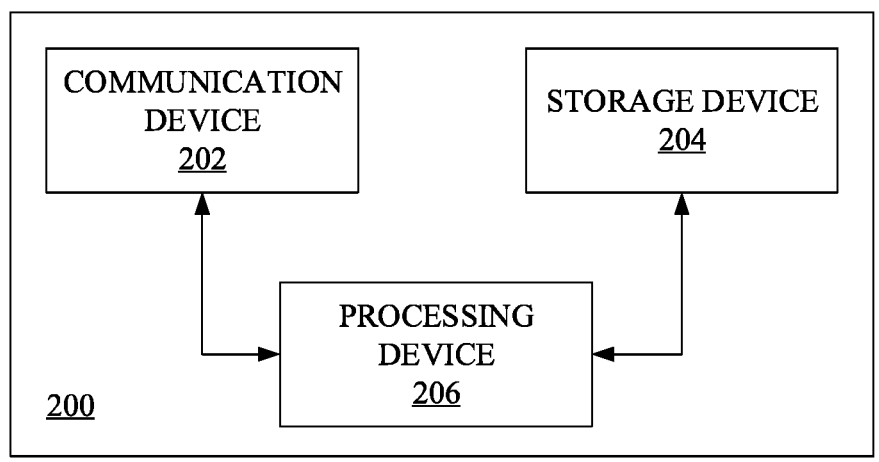
FIG. 2 is a block diagram of a system for facilitating policy-compliant end-to-end encryption for individuals between organizations, in accordance with some embodiments.

FIG. 2 is a block diagram of a system 200 for facilitating policy-compliant end-to-end encryption for individuals between organizations, in accordance with some embodiments. Accordingly, the system 200 may include a communication device 202, a storage device 204, and a processing device 206.

Further, the communication device 202 may be configured for receiving a first recipient indication associated with a first recipient of a first tenant from a sender device associated with a sender of a second tenant. Further, the sender device may include a mobile device 106 (such as a smartphone, a laptop, a tablet computer, etc.), other electronic devices 110 (such as desktop computers, server computers, etc.). Further, the communication device 202 may be configured for transmitting at least one recipient certificate to the sender device. Further, the sender device may be configured for encrypting a message associated with the first recipient based on the at least one recipient certificate. Further, the sender device may be configured for transmitting the message to a first recipient device associated with the first recipient. Further, the first recipient device may include a mobile device 106 (such as a smartphone, a laptop, a tablet computer, etc.), other electronic devices 110 (such as desktop computers, server computers, etc.).

Further, the storage device 204 may be configured for retrieving a predefined policy definition associated with the first tenant based on the first recipient indication. Further, the storage device 204 may be configured for retrieving the at least one recipient certificate associated with the first recipient based on the identifying.

Further, the processing device 206 may be configured for identifying at least one recipient certificate associated with the first recipient based on the predefined policy definition.

Further, in some embodiments, the communication device 202 may be further configured for receiving a plurality of potential recipient certificates from the sender device. Further, the sender device may include the plurality of potential recipient certificates. Further, the processing device 206 may be further configured for determining compliance of a plurality of potential recipient certificates with the predefined policy definition. Further, the processing device 206 may be further configured for identifying the at least one recipient certificate from the plurality of potential recipient certificates based on the determining. Further, the sender device may be configured for encrypting the message using the at least one recipient certificate based on the identifying.

Further, in some embodiments, the identifying may include searching of the at least one recipient certificate in a virtual global address list. Further, the virtual global address list associated with a plurality of certificates. Further, the virtual global address list allows for filtering of the at least one recipient certificate from the plurality of certificates based on the predefined policy definition. Further, the processing device 206 may be further configured for generating an availability of the at least one recipient certificate based on the identifying. Further, the availability may include a positive availability and a negative availability. Further, the plurality of certificates may include the at least one recipient certificate for the positive availability and the plurality of certificates does not may include the at least one recipient certificate for the negative availability. Further, the storage device 204 may be further configured for storing the availability of the at least one recipient certificate. Further, in some embodiments, the retrieving of the at least one recipient certificate may be based on the availability being the positive availability. Further, the transmitting of the at least one recipient certificate to the sender device may be based on the retrieving. Further, the sender device may be configured for encrypting the message associated with the first recipient based on the at least one recipient certificate. Further, the sender device may be configured for transmitting the message to the first recipient device associated with the first recipient. Further, in some embodiments, the retrieving of a master certificate associated with the first tenant may be based on the availability being the negative availability. Further, the transmitting of the master certificate to the sender device may be based on the retrieving. Further, the sender device may be configured for encrypting the message based on the master certificate. Further, the sender device may be configured for transmitting the message to the first recipient device associated with the first recipient.

Further, in some embodiments, the communication device 202 may be further configured for receiving the message from the first recipient device. Further, the communication device 202 may be further configured for receiving the at least one recipient certificate from the first recipient device. Further, the first recipient device may include the at least one recipient certificate. Further, the communication device 202 may be further configured for transmitting the message to the first recipient device based on the encrypting. Further, the first recipient device may be configured for decrypting the message based on the at least one recipient certificate. Further, the processing device 206 may be further configured for identifying a master key associated with the first tenant based on the message. Further, the first recipient may be associated with the first tenant. Further, the processing device 206 may be further configured for decrypting a header of the message based on the master key. Further, the processing device 206 may be further configured for encrypting the header based on the at least one recipient certificate. Further, the storage device 204 may be further configured for storing the at least one recipient certificate corresponding to the first recipient. Further, in some embodiments, the communication device 202 may be further configured for receiving the first recipient indication associated with the first recipient of the first tenant from the sender device. Further, the communication device 202 may be further configured for transmitting the at least one recipient certificate to the sender device. Further, the sender device may be configured for encrypting the message associated with the first recipient based on the at least one recipient certificate. Further, the sender device may be configured for transmitting the message to the first recipient device associated with the first recipient. Further, the storage device 204 may be further configured for retrieving the at least one recipient certificate associated with the first recipient based on the first recipient indication.

Further, in some embodiments, the communication device 202 may be further configured for receiving a list of roots and a list of object identifiers associated with at least one policy from an admin device associated with a tenant. Further, the tenant may include the first tenant and the second tenant. Further, the list of roots and the list of object identifiers may be configured for defining the at least one policy. Further, the processing device 206 may be further configured for analyzing the list of roots and the list of object identifiers. Further, the processing device 206 may be further configured for generating a policy definition associated with the tenant based on the analyzing of the list of roots and the list of object identifiers. Further, the policy definition may include the predefined policy definition. Further, the storage device 204 may be configured for storing the policy definition associated with the tenant.

Further, in some embodiments, the communication device 202 may be further configured for receiving at least one recipient certificate indication corresponding to the at least one recipient certificate from the first recipient device. Further, the storage device 204 may be further configured for retrieving the at least one recipient certificate. Further, the storage device 204 may be further configured for storing the at least one recipient certificate associated with the first recipient based on the validating. Further, the processing device 206 may be further configured for validating the at least one recipient certificate based on the predefined policy definition associated with the first tenant.

Further, in some embodiments, the predefined policy definition may include a set of attributes. Further, the set of attributes may be configured for filtering the at least one recipient certificate from a plurality of certificates. Further, the at least one recipient certificate may be compliant with the predefined policy definition.

Figure 3:
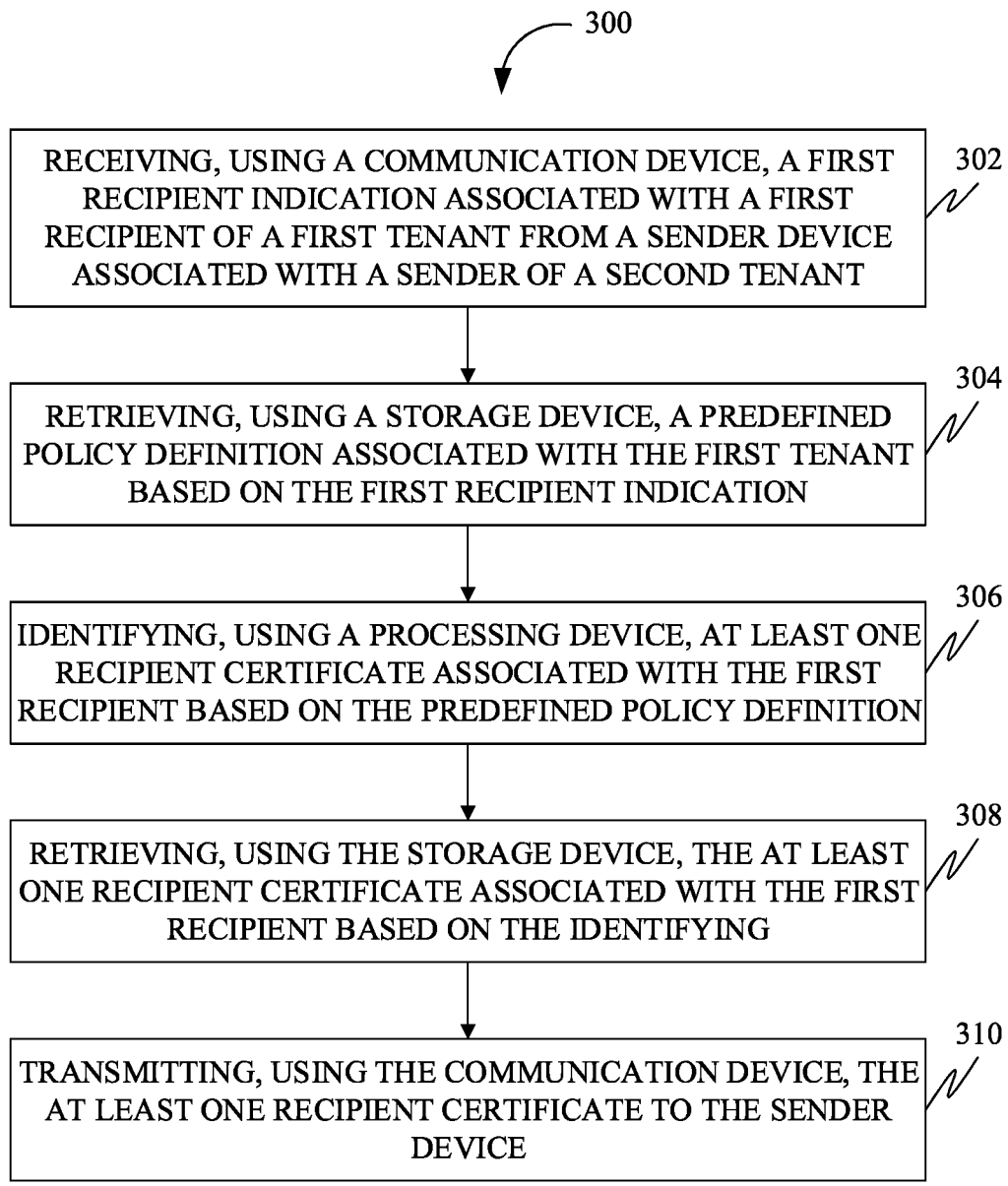
FIG. 3 is a flowchart of a method for facilitating policy-compliant end-to-end encryption for individuals between organizations, in accordance with some embodiments.

FIG. 3 is a flowchart of a method 300 for facilitating policy-compliant end-to-end encryption for individuals between organizations, in accordance with some embodiments. Accordingly, at 302, the method 300 may include a step of receiving, using a communication device, a first recipient indication associated with a first recipient of a first tenant from a sender device associated with a sender of a second tenant. Further, the sender device may include a mobile device 106 (such as a smartphone, a laptop, a tablet computer, etc.), other electronic devices 110 (such as desktop computers, server computers, etc.).

Further, at 304, the method 300 may include a step of retrieving, using a storage device, a predefined policy definition associated with the first tenant based on the first recipient indication.

Further, at 306, the method 300 may include a step of identifying, using a processing device, at least one recipient certificate associated with the first recipient based on the predefined policy definition.

Further, at 308, the method 300 may include a step of retrieving, using the storage device, the at least one recipient certificate associated with the first recipient based on the identifying.

Further, at 310, the method 300 may include a step of transmitting, using the communication device, the at least one recipient certificate to the sender device. Further, the sender device may be configured for encrypting a message associated with the first recipient based on the at least one recipient certificate. Further, the sender device may be configured for transmitting the message to a first recipient device associated with the first recipient. Further, the first recipient device may include a mobile device 106 (such as a smartphone, a laptop, a tablet computer, etc.), other electronic devices 110 (such as desktop computers, server computers, etc.).

Figure 4:
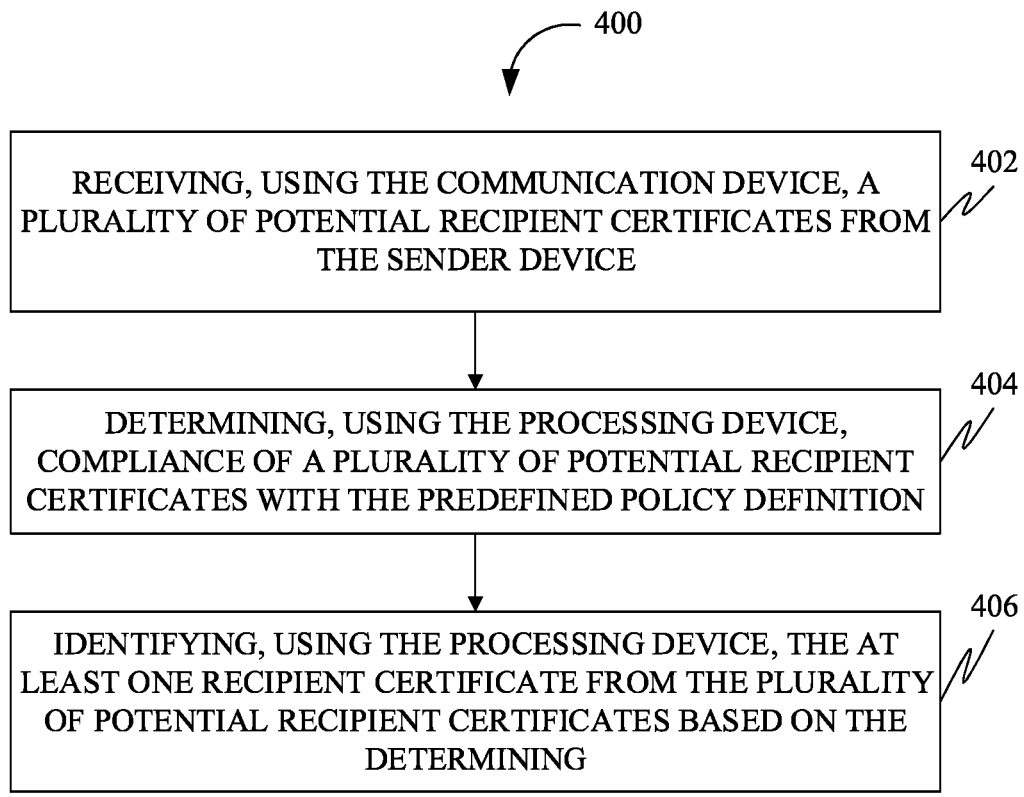
FIG. 4 is a flowchart of a method for facilitating determination of compliance of a potential recipient, in accordance with some embodiments.

FIG. 4 is a flowchart of a method 400 for facilitating determination of compliance of a potential recipient, in accordance with some embodiments. Accordingly, at 402, the method 400 may include a step of receiving, using the communication device, a plurality of potential recipient certificates from the sender device. Further, the sender device may include the plurality of potential recipient certificates.

Further, at 404, the method 400 may include a step of determining, using the processing device, compliance of a plurality of potential recipient certificates with the predefined policy definition.

Further, at 406, the method 400 may include a step of identifying, using the processing device, the at least one recipient certificate from the plurality of potential recipient certificates based on the determining. Further, the sender device may be configured for encrypting the message using the at least one recipient certificate based on the identifying.

Figure 5:
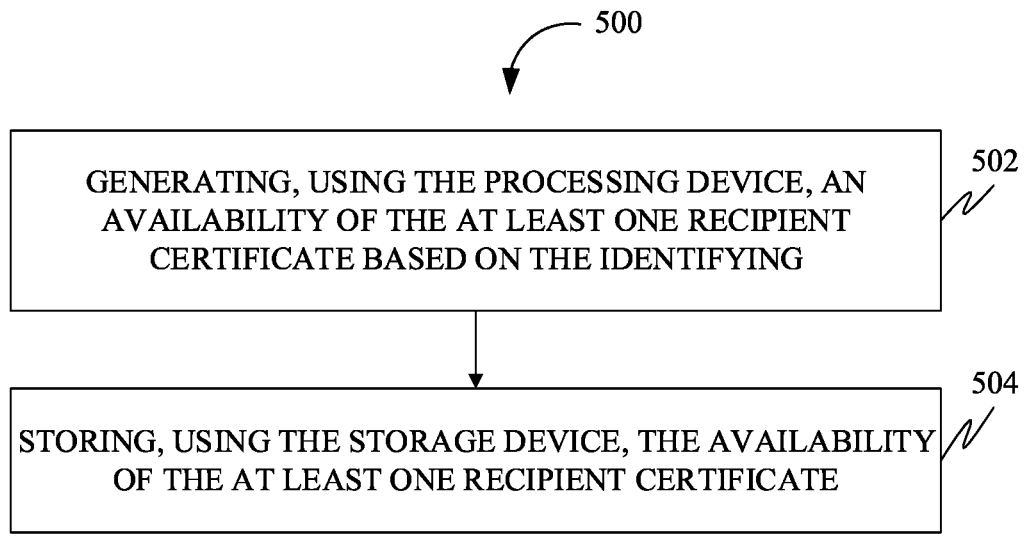
FIG. 5 is a flowchart of a method for facilitating generation of an availability of a recipient certificate, in accordance with some embodiments.

FIG. 5 is a flowchart of a method 500 for facilitating generation of an availability of a recipient certificate, in accordance with some embodiments. Further, the identifying may include searching of the at least one recipient certificate in a virtual global address list. Further, the virtual global address list associated with a plurality of certificates. Further, the virtual global address list allows for filtering of the at least one recipient certificate from the plurality of certificates based on the predefined policy definition. Further, at 502, the method 500 may include a step of generating, using the processing device, an availability of the at least one recipient certificate based on the identifying. Further, the availability may include a positive availability and a negative availability. Further, the plurality of certificates may include the at least one recipient certificate for the positive availability and the plurality of certificates does not may include the at least one recipient certificate for the negative availability.

Further, at 504, the method 500 may include a step of storing, using the storage device, the availability of the at least one recipient certificate.

Further, in some embodiments, the retrieving of the at least one recipient certificate may be based on the availability being the positive availability. Further, the transmitting of the at least one recipient certificate to the sender device may be based on the retrieving. Further, the sender device may be configured for encrypting the message associated with the first recipient based on the at least one recipient certificate.

Further, the sender device may be configured for transmitting the message to the first recipient device associated with the first recipient.

Further, in some embodiments, the retrieving of a master certificate associated with the first tenant may be based on the availability being the negative availability. Further, the transmitting of the master certificate to the sender device may be based on the retrieving. Further, the sender device may be configured for encrypting the message based on the master certificate. Further, the sender device may be configured for transmitting the message to the first recipient device associated with the first recipient.

Figure 6:
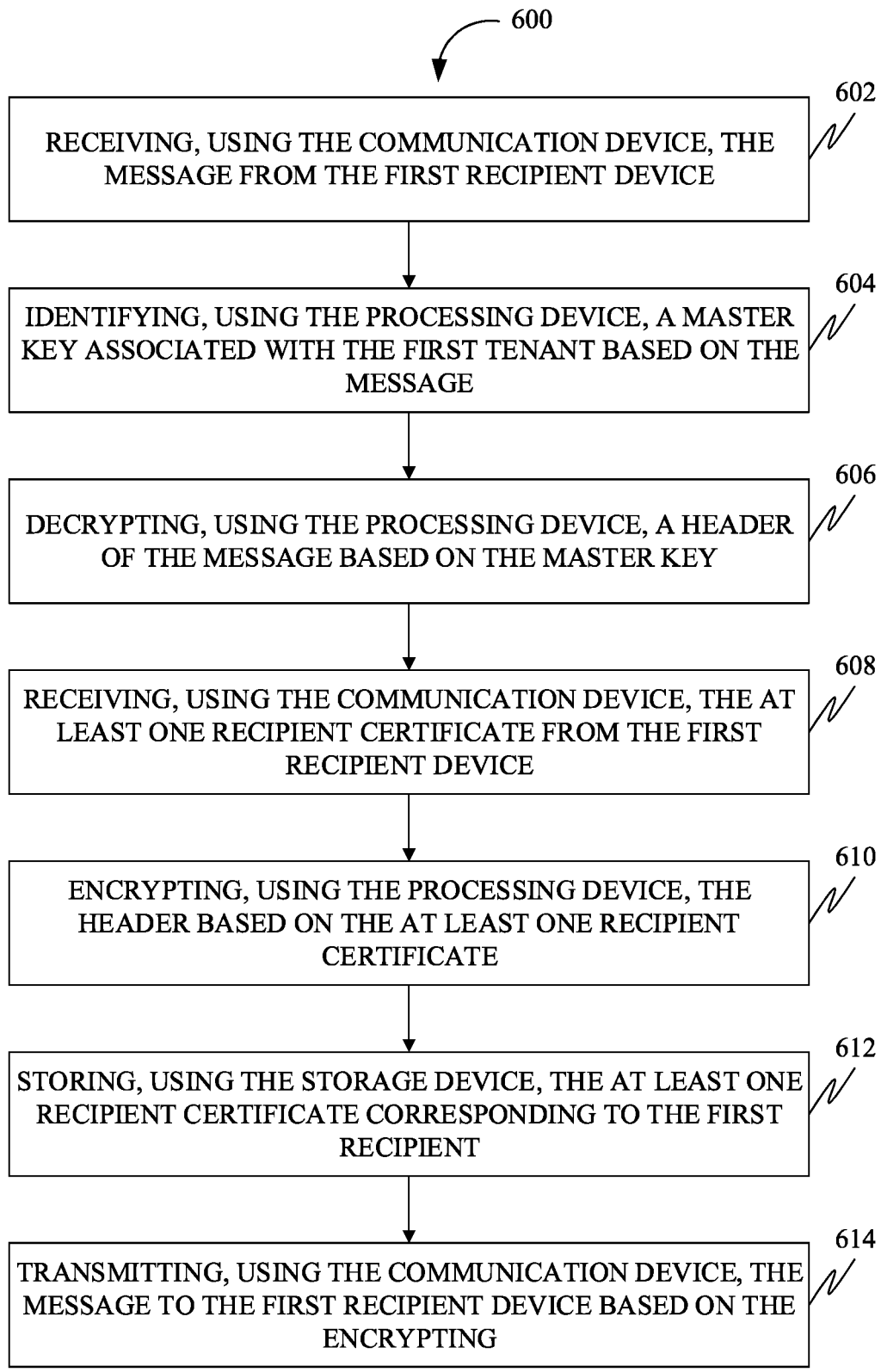
FIG. 6 is a flowchart of a method for facilitating identification of a master key, in accordance with some embodiments.

FIG. 6 is a flowchart of a method 600 for facilitating identification of a master key, in accordance with some embodiments. Accordingly, at 602, the method 600 may include a step of receiving, using the communication device, the message from the first recipient device.

Further, at 604, the method 600 may include a step of identifying, using the processing device, a master key associated with the first tenant based on the message. Further, the first recipient may be associated with the first tenant.

Further, at 606, the method 600 may include a step of decrypting, using the processing device, a header of the message based on the master key.

Further, at 608, the method 600 may include a step of receiving, using the communication device, the at least one recipient certificate from the first recipient device. Further, the first recipient device may include the at least one recipient certificate.

Further, at 610, the method 600 may include a step of encrypting, using the processing device, the header based on the at least one recipient certificate.

Further, at 612, the method 600 may include a step of storing, using the storage device, the at least one recipient certificate corresponding to the first recipient.

Further, at 614, the method 600 may include a step of transmitting, using the communication device, the message to the first recipient device based on the encrypting. Further, the first recipient device may be configured for decrypting the message based on the at least one recipient certificate.

Figure 7:
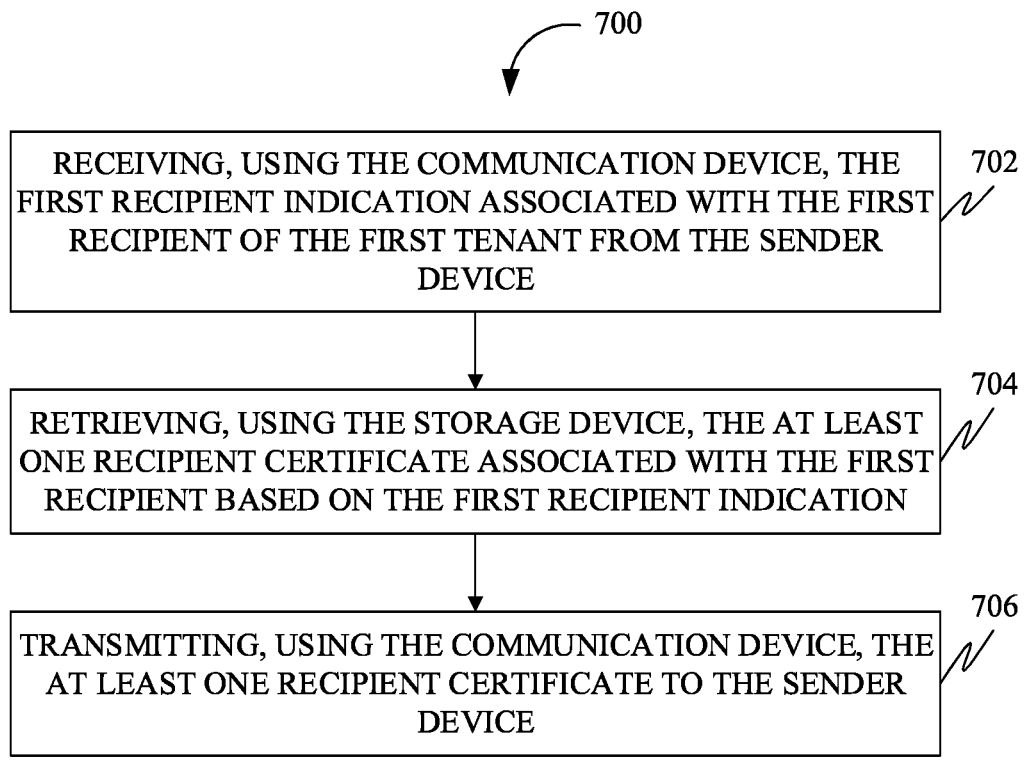
FIG. 7 is a flowchart of a method for facilitating retrieval of a recipient certificate, in accordance with some embodiments.

FIG. 7 is a flowchart of a method 700 for facilitating retrieval of a recipient certificate, in accordance with some embodiments. Accordingly, at 702, the method 700 may include a step of receiving, using the communication device, the first recipient indication associated with the first recipient of the first tenant from the sender device. Further, at 704, the method 700 may include a step of retrieving, using the storage device, the at least one recipient certificate associated with the first recipient based on the first recipient indication.

Further, at 706, the method 700 may include a step of transmitting, using the communication device, the at least one recipient certificate to the sender device. Further, the sender device may be configured for encrypting the message associated with the first recipient based on the at least one recipient certificate. Further, the sender device may be configured for transmitting the message to the first recipient device associated with the first recipient.

Figure 8:
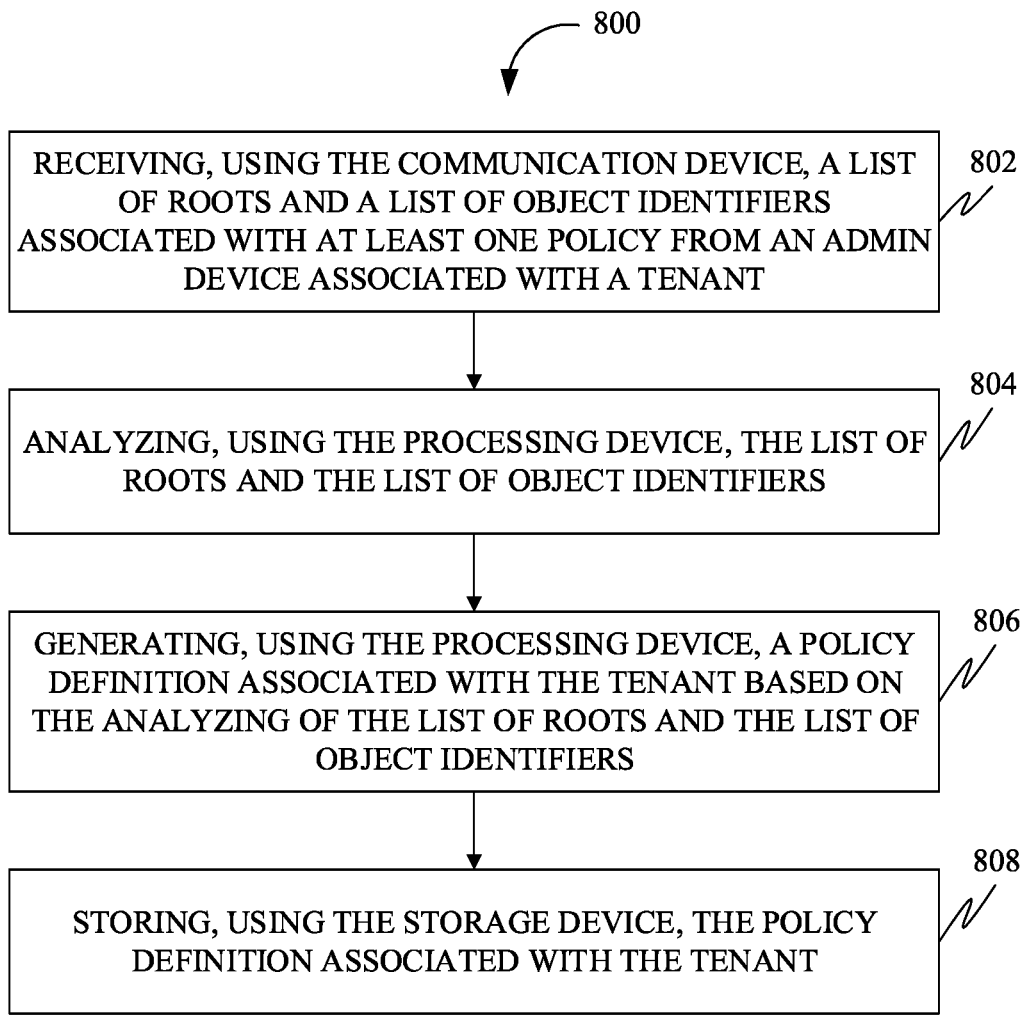
FIG. 8 is a flowchart of a method for facilitating generation of a policy definition, in accordance with some embodiments.

FIG. 8 is a flowchart of a method 800 for facilitating generation of a policy definition, in accordance with some embodiments. Accordingly, at 802, the method 800 may include a step of receiving, using the communication device, a list of roots and a list of object identifiers associated with at least one policy from an admin device associated with a tenant. Further, the tenant may include the first tenant and the second tenant. Further, the list of roots and the list of object identifiers may be configured for defining the at least one policy.

Further, at 804, the method 800 may include a step of analyzing, using the processing device, the list of roots and the list of object identifiers.

Further, at 806, the method 800 may include a step of generating, using the processing device, a policy definition associated with the tenant based on the analyzing of the list of roots and the list of object identifiers. Further, the policy definition may include the predefined policy definition.

Further, at 808, the method 800 may include a step of storing, using the storage device, the policy definition associated with the tenant.

Figure 9:
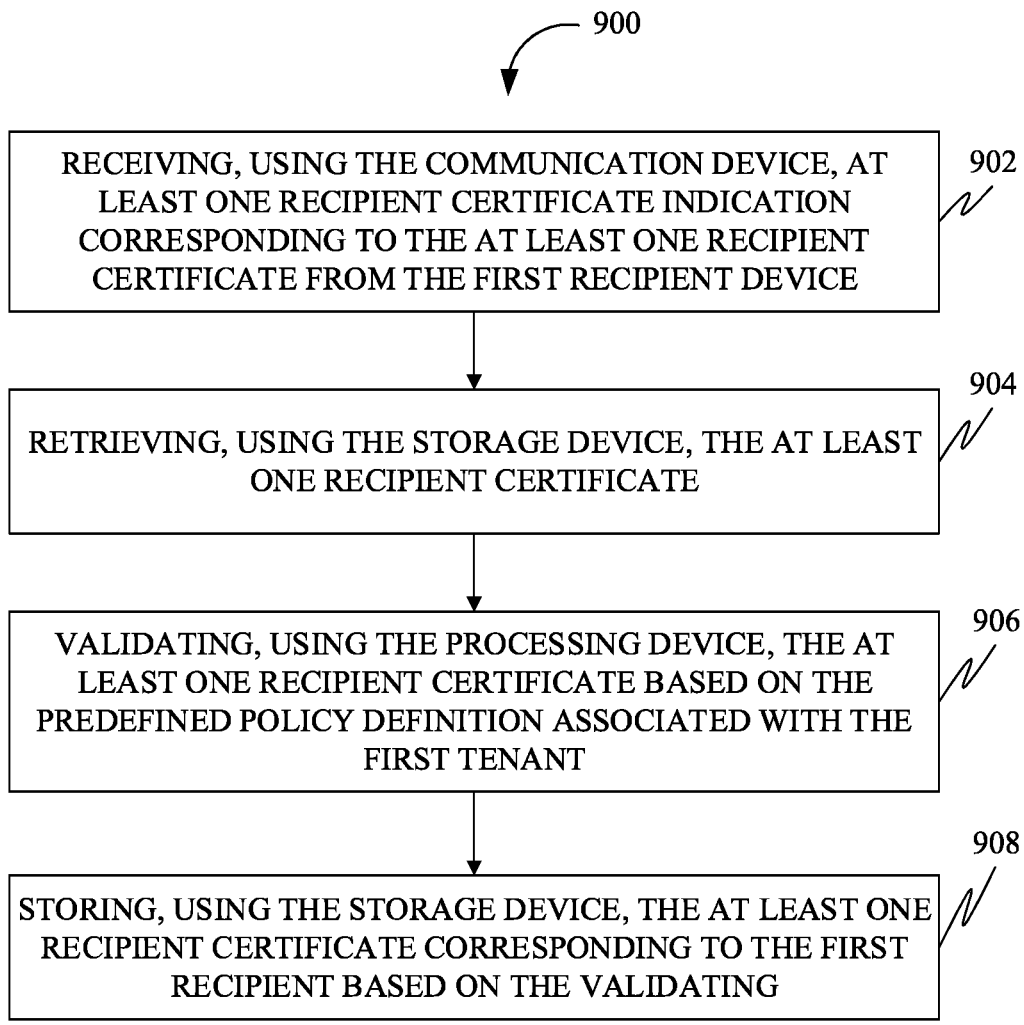
FIG. 9 is a flowchart of a method for facilitating retrieval of a recipient certificate, in accordance with some embodiments.

FIG. 9 is a flowchart of a method 900 for facilitating retrieval of a recipient certificate, in accordance with some embodiments. Accordingly, at 902, the method 900 may include a step of receiving, using the communication device, at least one recipient certificate indication corresponding to the at least one recipient certificate from the first recipient device.

Further, at 904, the method 900 may include a step of retrieving, using the storage device, the at least one recipient certificate.

Further, at 906, the method 900 may include a step of validating, using the processing device, the at least one recipient certificate based on the predefined policy definition associated with the first tenant.

Further, at 908, the method 900 may include a step of storing, using the storage device, the at least one recipient certificate corresponding to the first recipient based on the validating.

Further, in some embodiments, the predefined policy definition may include a set of attributes. Further, the set of attributes may be configured for filtering the at least one recipient certificate from a plurality of certificates. Further, the at least one recipient certificate may be compliant with the predefined policy definition.

Figure 10:
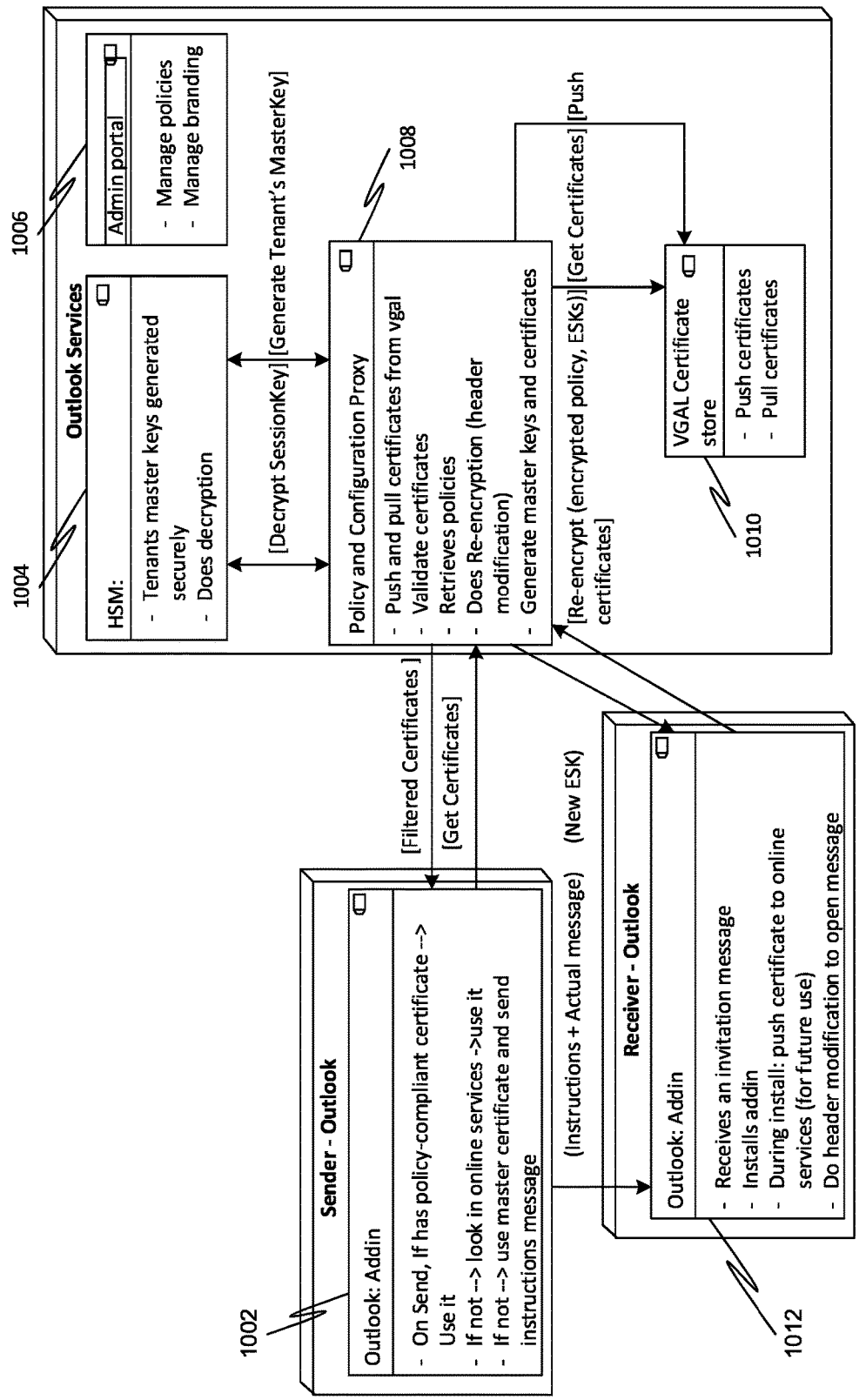
FIG. 10 is a schematic showing connecting flow between plugins for facilitating policy-compliant end-to-end encryption for individuals between organizations, in accordance with some embodiments.

FIG. 10 is a schematic showing connecting flow between plugins for facilitating policy-compliant end-to-end encryption for individuals between organizations, in accordance with some embodiments. Further, Microsoft Outlook plugin may be installed either by means of a setup file or by an invitation from at least one user who may have the Microsoft Outlook plugin already. Further, a first user, who has the Microsoft Outlook plugin installed, may write a mail message. Once finished, the first user may click "Encrypt & Send" custom button, and the Microsoft Outlook plugin iterates and processes each recipient of the message. Further, at 1002, the Microsoft Outlook plugin corresponding to a first user device (sender) is configured for transmitting a message to a second user device (recipient). Further, the message transmitted to the second user device may be encrypted. Further, for encryption of the message, if a recipient has a policy-compliant certificate, then the Microsoft Outlook plugin may keep the recipient as is and move on to the next recipient. Further, if not, the Microsoft Outlook plugin may communicate with outlook services trying to get a certificate for the recipient's email address. Further, if a certificate is found in the outlook services, then the outlook services may filter the certificates returned based on policy and only give back the recipient the compliant certificates. Further, the Microsoft Outlook plugin may update the recipient with that certificate and move on to the next recipient. Further, if no certificate back from the outlook services either, the Microsoft Outlook plugin may use a policy master certificate for encryption. Further, the actual message may be sent encrypted. At the same time, an instruction message (an invitation message) may be sent to the recipient telling how to install and be enrolled in the system.

Further, the outlook services may include services such as an HSM service 1004, an admin portal 1006, a policy and configuration proxy service 1008, and a VGAL certificate store service 1010. Further, the HSM service 1004 may re-encrypt headers that are encrypted with the tenant's master certificate using the actual user's pushed certificate. Further, the HSM service 1004 may use the tenant's master key, stored in a highly secure HSM, to do the decryption first. Further, the HSM service 1004 may encrypt the session key with the user's provided certificate to make decryption of the message possible at the second user device.

Further, the admin portal 1006 may be an authorization based portal for the management of policy definitions and tenants. Further, tenant' admins may use the admin portal 1006 to manage their organization's policy definition.

Further, the policy and configuration proxy service 1008 may serve requests to get policies and configurations. Further, the policy and configuration proxy service 1008 may include pushing and pulling certificates from VGAL. Further, the policy and configuration proxy service 1008 may include validating certificates. Further, the policy and configuration proxy service 1008 may include retrieving policies. Further, the policy and configuration proxy service 1008 may include re-encrypting (header modification). Further, the policy and configuration proxy service 1008 may include generating master keys and certificates.

Further, the VGAL certificate store service 1010 may serve pushing and pulling of certificates from VGAL.

Further, at 1012, the Microsoft Outlook plugin corresponding to a second user device (recipient) is configured for receiving a message from a first user device (sender). Further, the second user device may be associated with a second user. Further, the message received by the second user device may be encrypted. Further, the second user may receive an invitation message with instructions telling that the first user has sent him an encrypted message that can only be decrypted by installing the Microsoft Outlook plugin from a provided link. Further, the second user may install the Microsoft Outlook plugin. During installation, the second user may be asked to push the desired certificates to the outlook services to enable encryption in the future without referring to header modification. Once the Microsoft Outlook plugin may finish the installation, the encrypted message is header modified and may be decrypted. Further, the header modification may happen such that the Microsoft Outlook plugin may communicate with ReEncrypt endpoint in the outlook services that may decrypt the master certificate session key (ESK) using the master key (in the HSM) and encrypts back the session key using the actual certificate of the first user and the second user.

Figure 11:
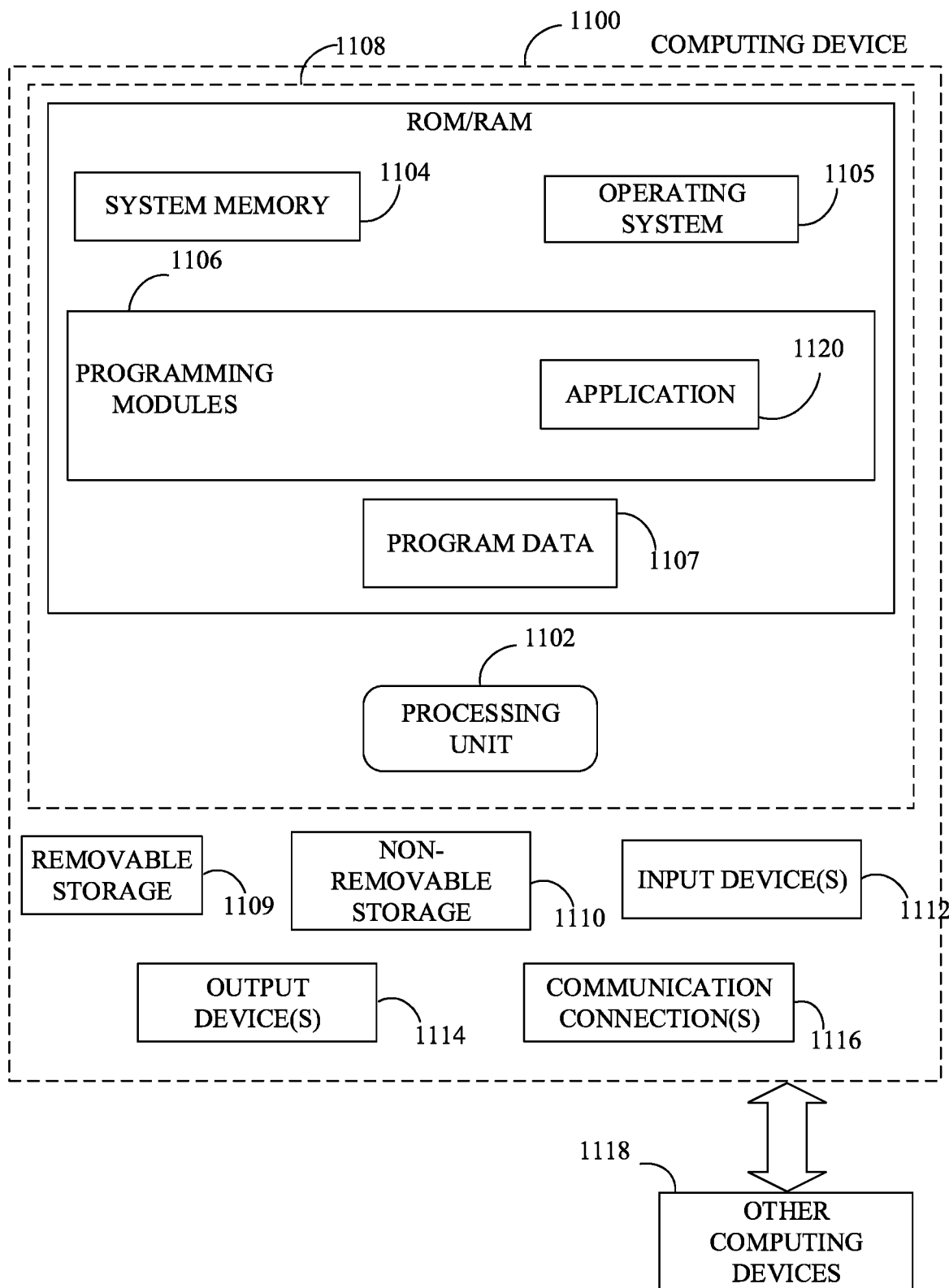
FIG. 11 is a block diagram of a computing device for implementing the methods disclosed herein, in accordance with some embodiments.

With reference to FIG. 11, a system consistent with an embodiment of the disclosure may include a computing device or cloud service, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination. The system memory 1104 may include operating system 1105, one or more programming modules 1106, and may include a program data 1107. Operating system 1105, for example, may be suitable for controlling computing device 1100's operation. In one embodiment, programming modules 1106 may include the image-processing module, machine learning module. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer-readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, a location sensor, a camera, a biometric sensor, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1104, including operating system 1105. While executing on processing unit 1102, programming modules 1106 (e.g., application 1120 such as a media player) may perform processes including, for example, one or more stages of methods, algorithms, systems, applications, servers, databases as described above. The aforementioned process is an example, and processing unit 1102 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method for facilitating policy-compliant end-to-end encryption for individuals between organizations, the method comprising:

receiving, using a communication device, a first recipient indication associated with a first recipient of a first tenant from a sender device associated with a sender of a second tenant;

retrieving, using a storage device, a predefined policy definition associated with the first tenant based on the first recipient indication;

identifying, using a processing device, at least one recipient certificate associated with the first recipient based on the predefined policy definition, wherein the identifying comprises searching the at least one recipient certificate in a virtual global address list, wherein the virtual global address list associated with a plurality of certificates, wherein the virtual global address list allows for filtering the at least one recipient certificate from the plurality of certificates based on the predefined policy definition;

generating, using the processing device, an availability of the at least one recipient certificate based on the identifying, wherein the availability comprises a positive availability and a negative availability, wherein the plurality of certificates comprises the at least one recipient certificate for the positive availability and the plurality of certificates does not comprise the at least one recipient certificate for the negative availability;

retrieving, using the storage device, the at least one recipient certificate associated with the first recipient based on the a master certificate associated with the first tenant is based on the availability being the negative availability;

transmitting, using the communication device, the master certificate to the sender device, wherein the sender device is configured for encrypting a message associated with the first recipient based on the master certificate, wherein the sender device is configured for transmitting the message to a first recipient device associated with the first recipient;

receiving, using the communication device, the message from the first recipient device;

identifying, using the processing device, a master key associated with the first tenant based on the message, wherein the first recipient is associated with the first tenant;

decrypting, using the processing device, a header of the message based on the master key;

receiving, using the communication device, the at least one recipient certificate from the first recipient device, wherein the first recipient device comprises the at least one recipient certificate;

re-encrypting, using the processing device, the header based on the at least one recipient certificate; and transmitting, using the communication device, the message to the first recipient device based on the encrypting, wherein the encrypting further comprises encrypting a session key using the at least one recipient certificate for allowing decryption of the message at the first recipient device.

2. The method of claim 1 further comprising:
receiving, using the communication device, a plurality of potential recipient certificates from the sender device, wherein the sender device comprises the plurality of potential recipient certificates;

determining, using the processing device, compliance of a plurality of potential recipient certificates with the predefined policy definition; and identifying, using the processing device, the at least one recipient certificate from the plurality of potential recipient certificates based on the determining, wherein the sender device is configured for encrypting the message using the at least one recipient certificate based on the identifying.

3. The method of claim 1, wherein the retrieving of the at least one recipient certificate is based on the availability being the positive availability, wherein the transmitting of the at least one recipient certificate to the sender device is based on the retrieving, wherein the sender device is configured for encrypting the message associated with the first recipient based on the at least one recipient certificate, wherein the sender device is configured for transmitting the message to the first recipient device associated with the first recipient.

4. The method of claim 1 further comprising:
receiving, using the communication device, the first recipient indication associated with the first recipient of the first tenant from the sender device;

retrieving, using the storage device, the at least one recipient certificate associated with the first recipient based on the first recipient indication; and transmitting, using the communication device, the at least one recipient certificate to the sender device, wherein the sender device is configured for encrypting the message associated with the first recipient based on the at least one recipient certificate, wherein the sender device is configured for transmitting the message to the first recipient device associated with the first recipient.

5. The method of claim 1 further comprising:
receiving, using the communication device, a list of roots and a list of object identifiers associated with at least one policy from an admin device associated with a tenant, wherein the tenant comprises the first tenant and the second tenant, wherein the list of roots and the list of object identifiers is configured for defining the at least one policy;

analyzing, using the processing device, the list of roots and the list of object identifiers;

generating, using the processing device, a policy definition associated with the tenant based on the analyzing of the list of roots and the list of object identifiers, wherein the policy definition comprises the predefined policy definition; and storing, using the storage device, the policy definition associated with the tenant.

6. The method of claim 1 further comprising:
receiving, using the communication device, at least one recipient certificate indication corresponding to the at least one recipient certificate from the first recipient device;

retrieving, using the storage device, the at least one recipient certificate;

validating, using the processing device, the at least one recipient certificate based on the predefined policy definition associated with the first tenant; and storing, using the storage device, the at least one recipient certificate corresponding to the first recipient based on the validating.

7. The method of claim 1, wherein the predefined policy definition comprises a set of attributes, wherein the set of attributes is configured for filtering the at least one recipient certificate from a plurality of certificates, wherein the at least one recipient certificate is compliant with the predefined policy definition.

8. A system for facilitating policy-compliant end-to-end encryption for individuals between organizations, the system comprising:
a communication device configured for:
receiving a first recipient indication associated with a first recipient of a first tenant from a sender device associated with a sender of a second tenant;

transmitting a master certificate to the sender device, wherein the sender device is configured for encrypting a message associated with the first recipient based on the master certificate, wherein the sender device is configured for transmitting the message to a first recipient device associated with the first recipient;

receiving the message from the first recipient device;

receiving at least one recipient certificate from the first recipient device, wherein the first recipient device comprises the at least one recipient certificate; and transmitting the message to the first recipient device based on the encrypting, wherein the encrypting further comprises encrypting a session key using the at least one recipient certificate for allowing decryption of the message at the first recipient device;

a storage device configured for:
retrieving a predefined policy definition associated with the first tenant based on the first recipient indication; and retrieving the master certificate associated with the first tenant is based on an availability being a negative availability; and a processing device configured for:
identifying the at least one recipient certificate associated with the first recipient based on the predefined policy definition, wherein the identifying comprises searching the at least one recipient certificate in a virtual global address list, wherein the virtual global address list associated with a plurality of certificates, wherein the virtual global address list allows for filtering the at least one recipient certificate from the plurality of certificates based on the predefined policy definition;

generating the availability of the at least one recipient certificate based on the identifying, wherein the availability comprises a positive availability and the negative availability, wherein the plurality of certificates comprises the at least one recipient certificate for the positive availability and the plurality of certificates does not comprise the at least one recipient certificate for the negative availability;

identifying a master key associated with the first tenant based on the message, wherein the first recipient is associated with the first tenant;

decrypting a header of the message based on the master key; and re-encrypting the header based on the at least one recipient certificate.

9. The system of claim 8, wherein the communication device is further configured for receiving a plurality of potential recipient certificates from the sender device, wherein the sender device comprises the plurality of potential recipient certificates, wherein the processing device is further configured for:

determining compliance of a plurality of potential recipient certificates with the predefined policy definition; and identifying the at least one recipient certificate from the plurality of potential recipient certificates based on the determining, wherein the sender device is configured for encrypting the message using the at least one recipient certificate based on the identifying.

10. The system of claim 8, wherein the retrieving of the at least one recipient certificate is based on the availability being the positive availability, wherein the transmitting of the at least one recipient certificate to the sender device is based on the retrieving, wherein the sender device is configured for encrypting the message associated with the first recipient based on the at least one recipient certificate, wherein the sender device is configured for transmitting the message to the first recipient device associated with the first recipient.

11. The system of claim 8, wherein the communication device is further configured for:

receiving the first recipient indication associated with the first recipient of the first tenant from the sender device; and transmitting the at least one recipient certificate to the sender device, wherein the sender device is configured for encrypting the message associated with the first recipient based on the at least one recipient certificate, wherein the sender device is configured for transmitting the message to the first recipient device associated with the first recipient, wherein the storage device is further configured for retrieving the at least one recipient certificate associated with the first recipient based on the first recipient indication.

12. The system of claim 8, wherein the communication device is further configured for receiving a list of roots and a list of object identifiers associated with at least one policy from an admin device associated with a tenant, wherein the tenant comprises the first tenant and the second tenant, wherein the list of roots and the list of object identifiers is configured for defining the at least one policy, wherein the processing device is further configured for:

analyzing the list of roots and the list of object identifiers; and generating a policy definition associated with the tenant based on the analyzing of the list of roots and the list of object identifiers, wherein the policy definition comprises the predefined policy definition, wherein the storage device is configured for storing the policy definition associated with the tenant.

13. The system of claim 8, wherein the communication device is further configured for receiving at least one recipient certificate indication corresponding to the at least one recipient certificate from the first recipient device, wherein the storage device is further configured for:

retrieving the at least one recipient certificate; and storing the at least one recipient certificate associated with the first recipient based on the validating, wherein the processing device is further configured for validating the at least one recipient certificate based on the predefined policy definition associated with the first tenant.

14. The system of claim 8, wherein the predefined policy definition comprises a set of attributes, wherein the set of attributes is configured for filtering the at least one recipient certificate from a plurality of certificates, wherein the at least one recipient certificate is compliant with the predefined policy definition.

* * * * *